(12) United States Patent
Richardson

(10) Patent No.: US 6,471,223 B1
(45) Date of Patent: Oct. 29, 2002

(54) AUXILIARY LIFT AXLE SUSPENSION

(75) Inventor: Gregory A. Richardson, Muskegon, MI (US)

(73) Assignee: Holland USA, Inc., Holland, MI (US)

( * ) Notice: Subject to any disclaimer, the term of this patent is extended or adjusted under 35 U.S.C. 154(b) by 49 days.

(21) Appl. No.: 09/620,036

(22) Filed: Jul. 20, 2000

Related U.S. Application Data

(60) Provisional application No. 60/145,309, filed on Jul. 23, 1999.

(51) Int. Cl.$^7$ ................................................ B62D 61/12
(52) U.S. Cl. ............................ 280/86.5; 280/124.116; 280/124.157; 280/124.128; 280/86.75
(58) Field of Search ................... 280/86.751, 86.75, 280/81.6, 86.5, 124.116, 124.128, 124.157, 6.156, 214.153, FOR 161, FOR 168

(56) References Cited

U.S. PATENT DOCUMENTS

| | | |
|---|---|---|
| 4,427,213 A | 1/1984 | Raidel, Jr. |
| RE32,486 E | 9/1987 | Raidel, Jr. |
| 5,403,031 A | 4/1995 | Gottschalk et al. |
| 5,620,194 A | 4/1997 | Keeler et al. |

*Primary Examiner*—Lanna Mai
*Assistant Examiner*—Ruth Ilan
(74) *Attorney, Agent, or Firm*—McGarry Bair LLP

(57) ABSTRACT

A lift axle suspension adapted to be mounted to a vehicle frame for selectively supporting a vehicle frame on an axle with ground engaging wheels includes a pair of trailing arm assemblies each of which includes a hanger bracket adapted to be mounted to the vehicle frame, a trailing arm pivotally mounted to the hanger bracket for pivotal movement relative to the frame about a pivot axis, a spring operably connecting the trailing arm to the vehicle frame for resisting the pivotal movement of the trailing arm about the pivotal axis toward the frame, an inflatable lift bag operably connecting the trailing arm to the hanger bracket and for selectively raising the trailing arm relative to the frame when the lift bag is inflated and an axle rigidly mounted to the trailing arm. The iift bag is positioned inboard of the hanger bracket and the trailing arm. The hanger bracket is adapted to be mounted to the outboard side of the frame rail. Preferably, the lift bag is laterally spaced from a plane in which the trailing aim pivots. The hanger bracket is U-shaped in horizontal cross section and the hanger bracket has a stiffening element mounted vertically within sidewalls of the U-shaped cross section. The pivot axis between the trailing arm and the hanger bracket is between forward and rearward ends of the trailing arm. The axle is mounted rearwardly of the pivot axis and the lift bag is mounted forwardly of the pivot axis. Substantially the entire lift bag is located forwardly of the pivot axis and above the forward end of the trailing arm.

29 Claims, 4 Drawing Sheets

AUXILIARY LIFT AXLE SUSPENSION

CROSS REFERENCE TO RELATED APPLICATIONS

This application claims priority on U.S. Provisional Patent Application 60/145,309, filed Jul. 23, 1999.

BACKGROUND OF THE INVENTION

1. Field of the Invention

The invention relates to a lift axle suspension having a trailing arm and an inflatable lift bag for raising and lowering the trailing arm in response to the introduction of pressurized air into and exhaustion of pressurized air from the lift bag. In one of its aspects, the invention relates to a reduced weight lift axle suspension having a relatively narrow width trailing arm with an inboard mounted lift bag.

2. Description of the Related Art

Lift axle suspensions are commonly used in semi-tractor/trailer configurations where the varying load of the tractor or trailer can require the need for additional suspensions for distributing the vehicle load over a variable number of ground contact points. Lift axle suspensions typically comprise a pair of trailing arm assemblies between which is supported a vehicle axle with rotatably mounted wheels. Each of the trailing arm assemblies comprises an trailing arm having one end pivotally mounted directly to the vehicle frame or indirectly to the vehicle frame through a frame hanger bracket. Another portion of the trailing arm is connected to the vehicle frame through an air spring.

In previous lift axle suspensions, the trailing arm was typically mounted within the hanger bracket. In these configurations, the lift bag is also mounted within the hanger bracket, resulting in a relatively wide spacing of the hanger bracket plates to accommodate the width of the lift bag, which was typically wider than the trailing arm. The lift bag was mounted between the hanger bracket and the trailing arm but outside the upper rotation limit of the trailing arm to avoid interference with the trailing arm upward movement thereof. The lift bag is thus placed well above the trailing arm.

As a result of the relatively wide dimensions of the hanger bracket, previous trailing arms tended to be designed in a width at least equal to that of the lift bag, which was greater than the width needed for load bearing and other operational parameters. Other suspension components and accessories that interact with the trailing arm were also designed wider and or longer than structurally required to accommodate the extra width of the trailing arm. As a result, these lift axle suspensions tended to be relatively heavy or at least heavier than necessary to carry out the required functions. A reduction in the size and weight of the currently used trailing arm suspensions translates into material cost savings during the construction of the trailing arm assemblies and fuel cost savings during the operation of a vehicle with the lighter trailing arm assembly. More importantly, there is a desire to reduce the weight of current trailing arm assemblies incorporating a lift mechanism.

Additionally, the length of the frame bracket is determined in part by the position of the lift bag in the frame bracket and not necessarily by other features of the suspension. It may be that shorter, and thus lighter, yet of equal strength and function, frame brackets may be achieved without the limitations imposed by an interior-mounted lift bag. Further, the required spacing of the lift bag to avoid the travel of the trailing arm determined the radial distance between the lift bag and the pivot axis of the trailing arm. The greater the radial distance between the lift bag and the pivot axis of the trailing arm, the greater the required elongation of the lift bag to rotate the trailing arm between its retracted and extended positions.

Vehicles with a lift axle suspension have an air pressure system for supplying pressurized air to the air springs, brakes and other accessories. Often an auxiliary air tank, air lines, height control valves, and other air system components are mounted to the frame underneath the vehicle. The sizes of the lift bag and frame bracket limit the available space for these accessories. There is a continuous need for more space to mount the various air system accessories.

SUMMARY OF THE INVENTION

According to the invention, a lift axle suspension adapted to be mounted to a vehicle frame for selectively supporting a vehicle frame on an axle with ground engaging wheels comprises a pair of trailing arm assemblies each of which includes a hanger bracket adapted to be mounted to the vehicle frame, a trailing arm pivotally mounted to the hanger bracket for pivotal movement relative to the frame about a pivot axis, a spring operably connecting the trailing arm to the vehicle frame for resisting the pivotal movement of the trailing arm about the pivotal axis toward the frame, an inflatable lift bag operably connecting the trailing arm to the hanger bracket and for selectively raising the trailing arm relative to the frame when the lift bag is inflated and an axle rigidly mounted to the trailing arm. According to the invention, the lift bag is positioned laterally of the hanger bracket, preferably inboard of the hanger bracket and the trailing arm. The hanger bracket is adapted to be mounted to the outboard side of the frame rail. Preferably, the lift bag is laterally spaced from a plane in which the trailing arm pivots.

In one embodiment, the trailing arm comprises a pair of parallel side plates and the hanger bracket fits between the parallel side plates of the trailing arm at the pivot axis. A bushed connector pivotally mounts the pair of parallel side plates of the trailing arm to the hanger bracket.

In a preferred embodiment, the hanger bracket is U-shaped in horizontal cross section and the hanger bracket has a stiffening element mounted within sidewalls of the U-shaped cross section. Further, the hanger bracket tapers from an upper portion toward the trailing arm, and the stiffening element extends in a direction from the frame to the trailing arm.

In a practical embodiment of the invention, a frame bracket is mounted to the hanger bracket and an arm bracket mounted to the trailing arm. The lift bag extends between the frame and arm brackets. The frame bracket is positioned at a lower portion of the hanger bracket and the arm bracket is positioned at an upper portion of the trailing arm. The lift bag has a width greater than a width of the hanger bracket.

In a preferred embodiment of the invention, the pivot axis between the trailing arm and the hanger bracket is between forward and rearward ends of the trailing arm. The axle is mounted rearwardly of the pivot axis and the lift bag is mounted forwardly of the pivot axis. Substantially the entire lift bag is located forwardly of the pivot axis and above the forward end of the trailing arm.

The invention provides an effective lift axle suspension with a relatively low weight because the trailing arm and frame brackets are relatively narrow. Further, the lift bag can be mounted relatively close to the pivot axis without interfering with the movement of the trailing arm and thus has a relatively short extension to raise the trailing arm. Thus, the lift bag can be relatively short and relatively light in weight. The entire suspension forms a relative small package which results in more room beneath the vehicle frame for mounting of other accessories.

DETAILED DESCRIPTION OF THE PREFERRED EMBODIMENTS

Figure 1:
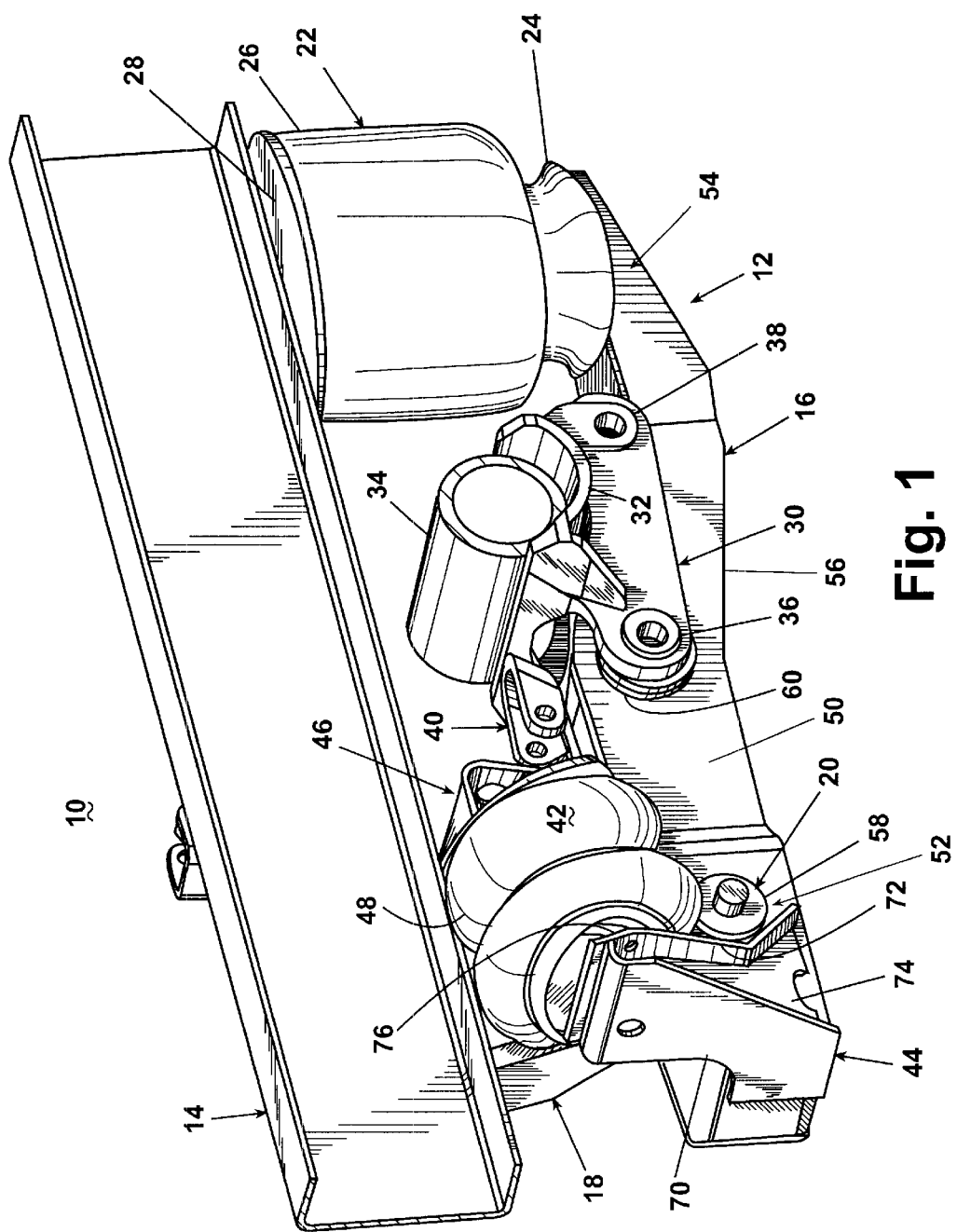
FIG. 1 is an inboard perspective view of a portion of a vehicle frame to which is mounted an trailing arm assembly according to the invention.

Referring now to the drawings, an auxiliary lift axle suspension 10 comprises a trailing arm assembly 12 mounted to a portion of a vehicle frame rail 14. The frame rail 14 is conventional and has a C-shaped cross section with a vertical web and opposing horizontal lips extending inboard. It should be noted for completeness that the auxiliary lift axle suspension 10 comprises a pair of trailing arm assemblies 12 mounted on opposing sides of the vehicle. For convenience, only one of the trailing arm assemblies 12 will be described with the understanding that the description applies to both trailing arm assemblies.

The trailing arm assembly 12 comprises a trailing arm 16 having a forward portion pivotally mounted to a hanger bracket 18 by a conventional bushed connection 20. An air spring 22 is positioned between a rear portion of the trailing arm 16 and the vehicle frame rail 14. The air spring comprises a piston 24 fixedly mounted to the rear portion of the trailing arm 16 and a ride bag 26 having one end mounted to the piston 24 and the other end mounted to the frame rail 14 through a mounting plate 28. An axle bracket 30 comprises an axle seat 32 for supporting a portion of the vehicle axle 34. The axle bracket 30 is mounted to a central portion of the trailing arm 16 by a pair of bushed connections 36, 38. A shock absorber bracket 40 extends from the axle bracket 30 and is adapted to mount one portion of a shock absorber, shown in phantom in FIG. 3.

A lift bag assembly 42 comprises an trailing arm bracket 44 and a frame bracket 46 between which extends a lift bag 48. The introduction or exhaustion of pressurized air into and out of the lift bag 48 raises and lowers the trailing arm 16 between a stored and used position.

Figure 2:
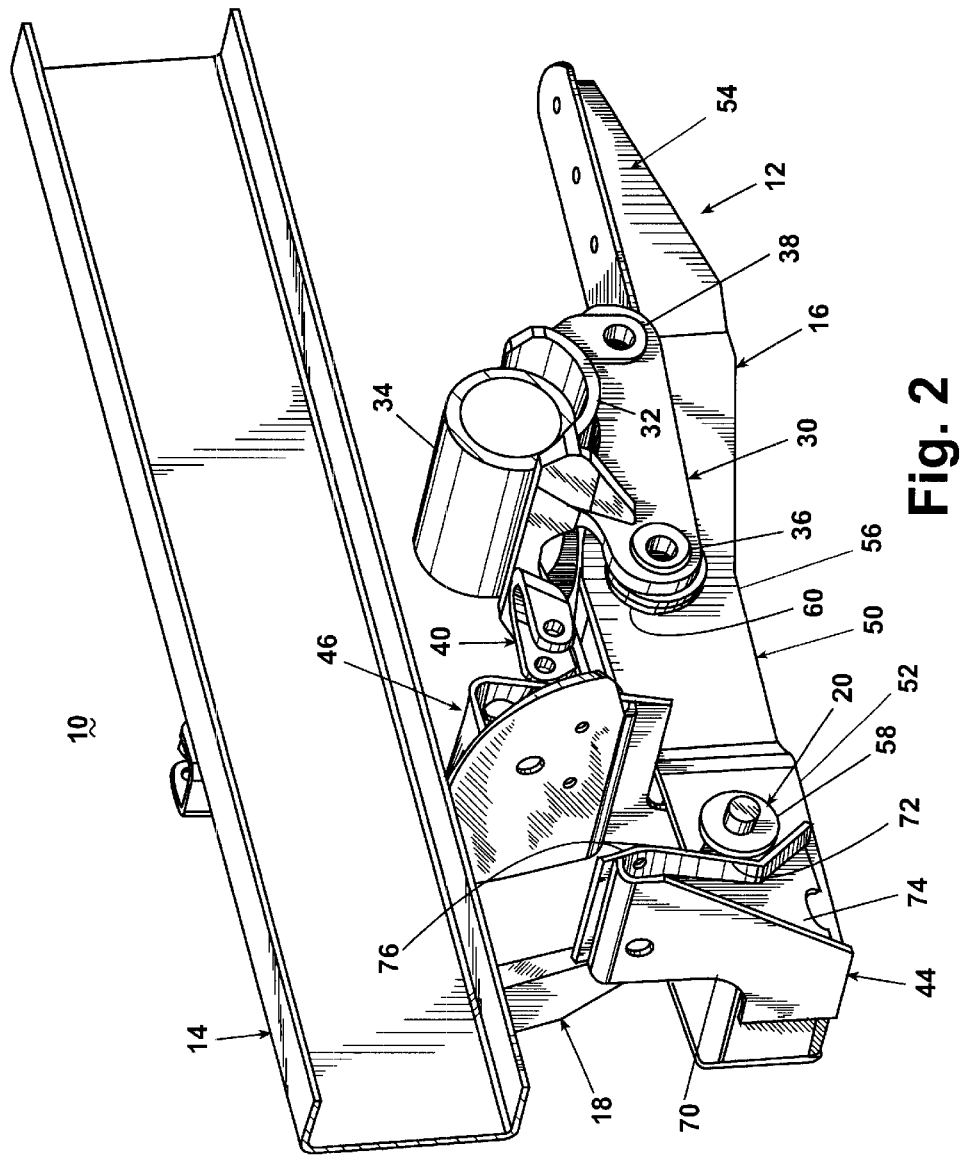
FIG. 2 is an inboard perspective view identical to FIG. 1, except that the lift bag and ride bag of the trailing arm assembly are removed for clarity.
Figure 3:
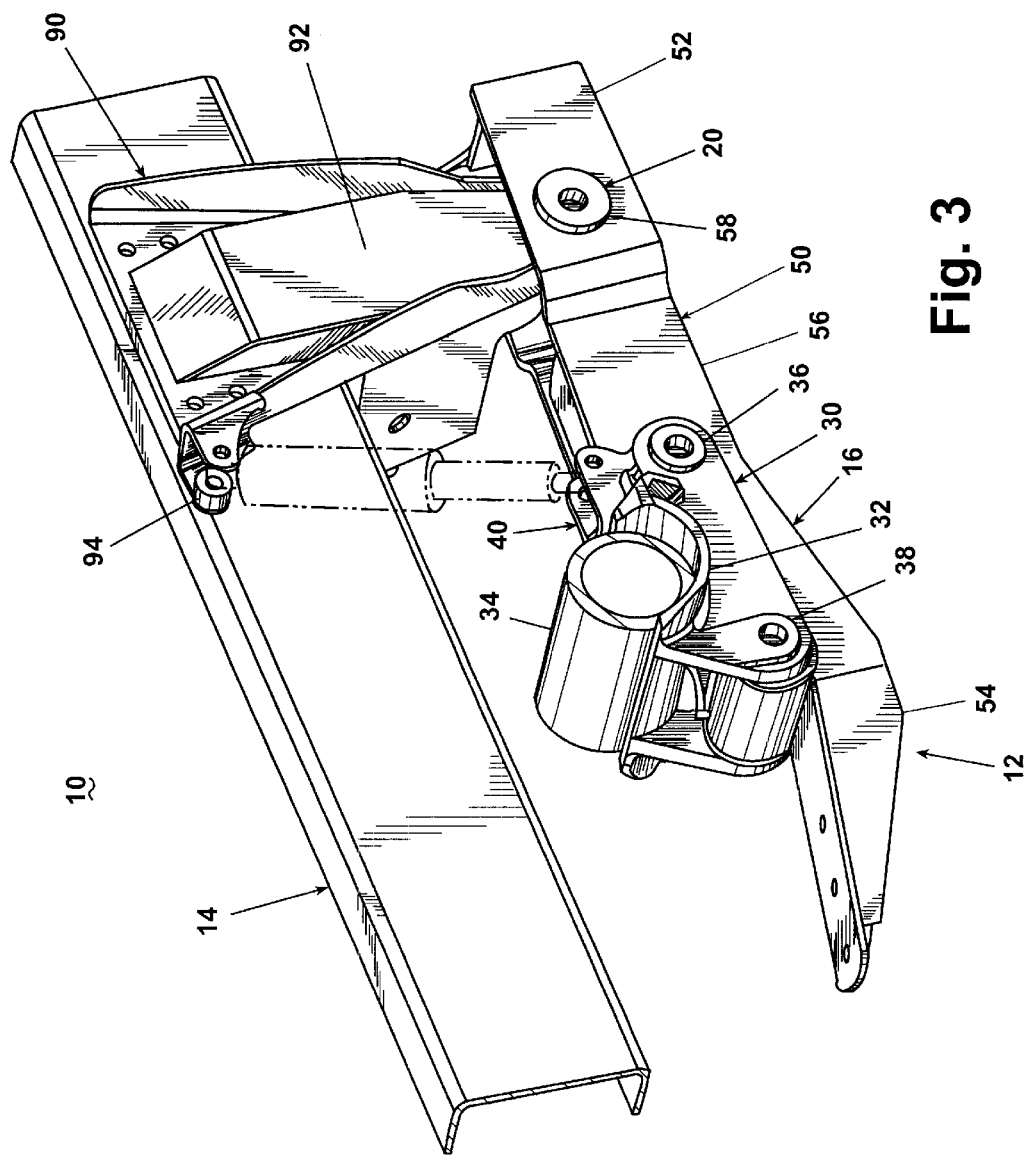
FIG. 3 is an outboard perspective view of the trailing arm of FIG. 2.
Figure 4:
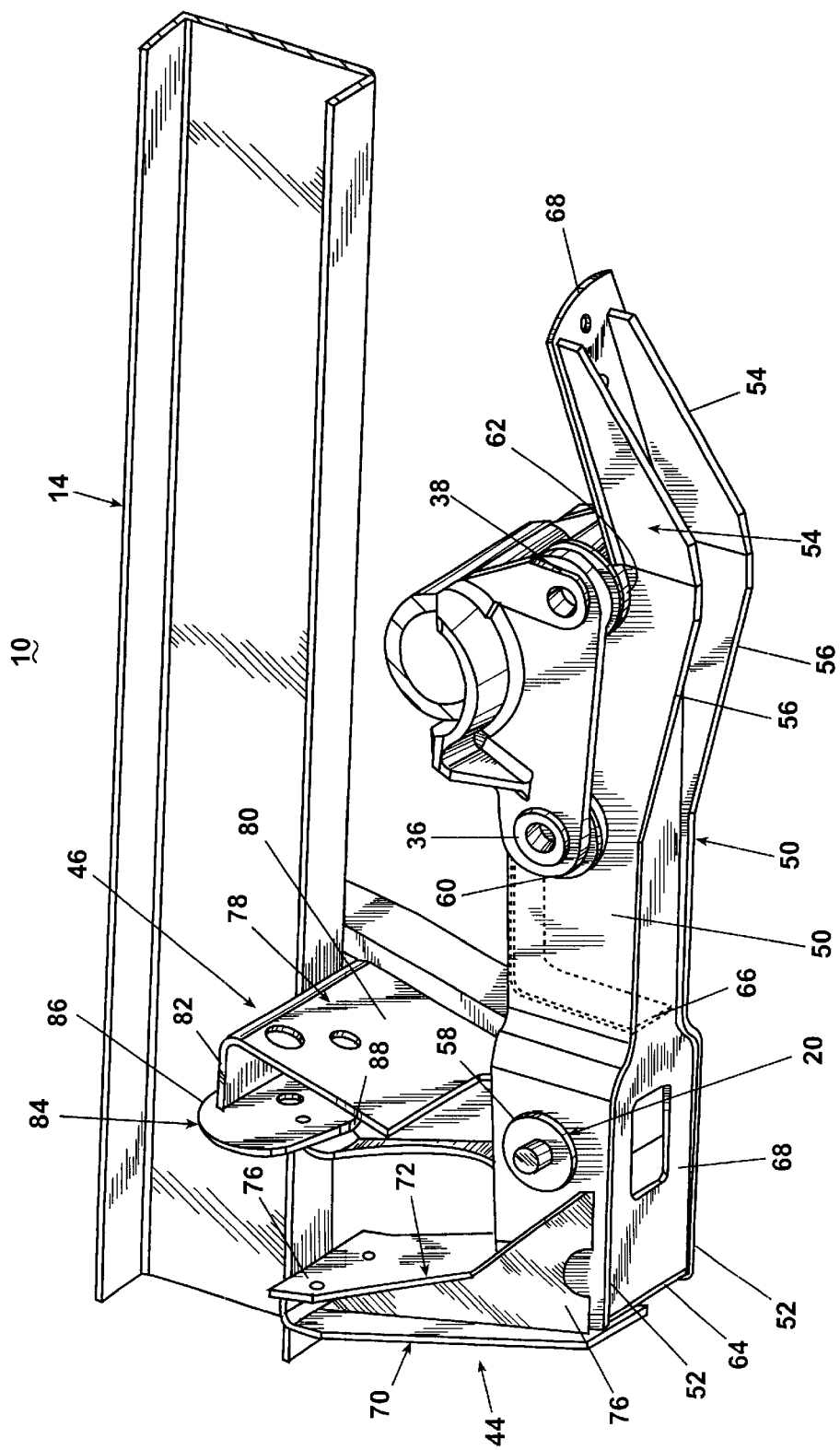
FIG. 4 is an inboard bottom perspective view of the trailing arm of FIG. 2.

Referring to FIGS. 2–4, the various components of the auxiliary lift axle suspension 10 will be described in greater detail. The trailing arm 16 comprises parallel side plates 50 each comprising a diverging forward end 52 and a triangular rear end portion 54 connected by a straight portion 56. The diverging ends 52 define the forward portion of the trailing arm. In a similar manner, the triangular portions 54 define the rear portion of the trailing arm and the straight walls 56 define the central portion.

The diverging ends 52 have openings 58 in which is received the bushed connection 20. The straight walls 56 include an opening 60 for the bushed connection 36 and a seat 62 (FIG. 4) for supporting the bushed connection 38.

The bushed connections are well known and are disclosed in the U.S. Pat. No. to Raidel, Jr., 4,427,213.

The forward portion of the trailing arm 16 further comprises front and rear cap plates 64 and 66 and a bottom plate 68, which extend between the diverging ends 52 of the side plates 50 to form an open-top box in the forward portion of the trailing arm. A piston mounting plate 68 connects the upper edges of the triangular portions 54. All of the various plates comprising the trailing arm are preferably welded together.

The trailing arm bracket 44 comprises a forward plate 70 connected to the cap plate 64 of the trailing arm and a rear plate 72 connected to the side of the inboard diverging end 52. A brace 74 extends between the front plate 70 and the rear plate 72 and has a lower edge that abuts the inboard diverging end 52. A flat portion on the rear plate 72 defines a mounting face 76 to which one end of the lift bag 48 is mounted.

The frame bracket 46 comprises a rear portion 78 having a back wall 80, whose inner edge abuts the hanger bracket 18, and a top wall 82, a portion of which abuts the frame rail 14. A mounting face 84 has a generally flat portion 86 abutting the end of the rear plate upper portion 82 and a stop flange 88 abutting the back wall 80. The flat portion 86 defines a mounting face to which is mounted the other end of the lift bag 48. As with the trailing arm, the various components of the trailing arm bracket 44 and the frame bracket 46 are preferably welded together.

The hanger bracket 18 comprises a U-shaped plate 90 that tapers from the frame rail toward the trailing arm 16. A closed-end box plate 92 is disposed within the channel defined by the U-plate 90 and forms with the rear wall of the U-plate 90 a box-like configuration at the trailing arm end of the hanger bracket 18, through which is formed an opening receiving the bushed connection 20. An upper shock absorber bracket 94 is formed as part of one portion of the sidewall of the U-shaped plate 90 and is positioned to cooperate with the lower shock absorber bracket 40.

In assembling the auxiliary lift axle suspension 10, the hanger bracket 18 is bolted to the frame rail 14 so that the U-plate 90 is on the outboard side of the frame rail 14. The upper portion 82, the back wall 80 of the frame bracket rear portion 78 are mounted to the frame rail 14 and hanger bracket 18, respectively. The trailing arm is positioned relative to the hanger bracket 18, so that the lower end of the hanger bracket 18, frame bracket 46, and frame bushed connection 20 are received within the open top of the box-like forward portion of the trailing arm 16. The bushed connection 20 is then secured to the diverging ends 52 of the trailing arm 16 to pivotally mount the trailing arm 16 relative to the hanger bracket 18. In essence, the trailing arm straddles the hanger bracket 18 and a portion of the frame bracket 46. With this configuration, the trailing arm is free to rotate relative to the hanger bracket 18 and the frame bracket 46 and the lift bag assembly mounted to the inboard side of the trailing arm 16. In other words, the lift bag lies outside the plane defined by the rotation of the trailing arm throughout its operational range, unlike prior art lift bags. An advantage of this configuration is that the lift bag can be positioned as close to the pivot point or trailing arm as desired without effecting the operation of the trailing arm and thereby reducing the length of the hanger bracket.

Another advantage of the invention is that the width of the trailing arm 16 is reduced relative to prior designs. Further, the trailing arm can straddle the hanger bracket in light of the location of the lift bag external to the hanger bracket, the hanger bracket is narrower than previous designs. The configuration of the design is such that the frame bracket can be positioned on one side, preferably the outboard side, of the frame rail and the lift bag can be positioned underneath or to the inboard side of the frame rail, presenting a relatively narrow width profile. The cumulative effect of the relative narrow trailing arm and hanger bracket provides a substantial weight reduction and an overall decrease in the volume occupied by the trailing arm assembly, resulting in increased free space beneath the truck or trailer.

Yet another advantage lies in that the lift bag can be mounted relatively low on the hanger bracket and relatively near to the pivot axis between the trailing arm and the hanger bracket. In more detail, the frame bracket is mounted to the hanger bracket approximately at the location of the bushed connector and the forward plate is mounted to the end of the trailing arm. As the lift bag is expanded to selectively lift the axle, the portion of the trailing arm below the lift bag moves downwardly as the axle moves upwardly. The location of the lift bag forwardly of the pivot axis between the trailing arm and the hanger bracket avoids operational interference between the lift bag and the trailing arm.

While the invention has been specifically described in connection with certain specific embodiments thereof, the invention is not limited to the specific embodiments. Reasonable variation and modification are possible within the scope of the forgoing disclosure without departing from the scope of the invention which is defined in the appended claims.

I claim:

1. In a lift axle suspension for selectively supporting a vehicle frame on an axle with ground engaging wheels, the lift axle suspension comprising:
    a pair of trailing arm assemblies adapted to be mounted to a vehicle frame, each of the trailing arm assemblies comprising:
        a hanger bracket adapted to be mounted to the vehicle frame;
        a trailing arm pivotally mounted to the hanger bracket for pivotal movement relative to the frame about a pivot axis between a raised and a lowered position to define a plane of operation for the trailing arm;
        a spring operably connecting the trailing arm to the vehicle frame for resisting the pivotal movement of the trailing arm about the pivotal axis toward the frame;
        an inflatable lift bag operably connecting the trailing arm to the hanger bracket and for selectively raising the trailing arm relative to the frame when the lift bag is inflated; and
        an axle rigidly mounted to the trailing arm;
    the improvement comprises:
        the lift bag is positioned laterally of the hanger bracket in a direction transverse to the vehicle frame and a portion of the lift bag is located on a side of the pivot axis opposite the axle.

2. The lift axle suspension according to claim 1 wherein the trailing arm comprises a pair of parallel side plates and the hanger bracket fits between the parallel side plates of the trailing arm at the pivotal mounting of the hanger bracket and the trailing arm.

3. The lift axle suspension according to claim 2, and further comprising a bushed connector pivotally mounting the pair of parallel side plates of the trailing arm to the hanger bracket.

4. The lift axle suspension according to claim 1 wherein the hanger bracket is U-shaped in horizontal cross section.

5. The lift axle suspension according to claim 4 wherein the hanger bracket has a stiffening element mounted within sidewalls of the U-shaped cross section.

6. The lift axle suspension according to claim 4 wherein the hanger bracket tapers from an upper portion toward the trailing arm and the stiffening element extends in a direction from the frame to the trailing arm.

7. The lift axle suspension according to claim 1, and further comprising a frame bracket mounted to the hanger bracket and an arm bracket mounted to the trailing arm, and the lift bag extends between the frame and arm brackets.

8. The lift axle suspension according to claim 7 wherein the frame bracket is positioned at a lower portion of the hanger bracket and the arm bracket is positioned at an upper portion of the trailing arm.

9. The lift axle suspension according to claim 8 wherein the hanger bracket is adapted to be mounted to an outboard side of the frame rail.

10. The lift axle suspension according to claim 1 wherein the lift bag is laterally spaced from a plane in which the trailing arm pivots.

11. The lift axle suspension according to claim 10 wherein the lift bag is positioned on an inboard side of the trailing arm.

12. The lift axle suspension according to claim 11 wherein the lift bag has a width greater than a width of the hanger bracket.

13. The lift axle suspension according to claim 1 wherein the lift bag is on an inboard side of the trailing arm.

14. The lift axle suspension according to claim 1 wherein the hanger bracket is adapted to be mounted to an outboard side of the frame rail.

15. The lift axle suspension according to claim 1 wherein the lift bag has a width greater than a width of the hanger bracket.

16. The lift axle suspension according to claim 1 wherein the pivot axis between the trailing arm and the hanger bracket is between forward and rearward ends of the trailing arm and the axle is mounted rearwardly of the pivot axis.

17. The lift axle suspension according to claim 16 wherein substantially all of the lift bag is located forwardly of the pivot axis.

18. The lift axle suspension according to claim 17 wherein the lift bag is located above the forward end of the trailing arm.

19. The lift axle suspension according to claim 1 wherein the spring is located on a side of the pivot axis opposite the portion of the lift bag.

20. The lift axle suspension according to claim 1 wherein substantially all of the lift bag is located on a side of the pivot axis opposite the axle.

21. The lift axle suspension according to claim 20 wherein all of the lift bag is located on a side of the pivot axis opposite the axle.

22. A lift axle suspension for selectively supporting a vehicle frame on an axle with ground engaging wheels, the lift axle suspension comprising:
    a pair of trailing arm assemblies adapted to be mounted to a vehicle frame, each of the trailing arm assemblies comprising:
        a trailing arm pivotally mounted to a hanger bracket for pivotal movement relative to the frame about a pivot axis and comprising a pair of parallel side plates;
        the hanger bracket adapted to be mounted to the vehicle frame and the hanger bracket fitting between the parallel side plates of the trailing arm at the pivotal mounting of the hanger bracket and the trailing arm;

a spring operably connecting the trailing arm to the vehicle frame for resisting the pivotal movement of the trailing arm about the pivotal axis toward the frame;

an inflatable lift bag positioned laterally of the hanger bracket in a direction transverse to the vehicle frame, operably connecting the trailing arm to the hanger bracket and for selectively raising the trailing arm relative to the frame when the lift bag is inflated; and an axle rigidly mounted to the trailing arm.

23. The lift axle suspension according to claim 22, and further comprising a bushed connector pivotally mounting the pair of parallel side plates of the trailing arm to the hanger bracket.

24. A lift axle suspension for selectively supporting a vehicle frame on an axle with ground engaging wheels, the lift axle suspension comprising:

a pair of trailing arm assemblies adapted to be mounted to a vehicle frame, each of the trailing arm assemblies comprising:

a hanger bracket adapted to be mounted to the vehicle frame;

a trailing arm pivotally mounted to the hanger bracket for pivotal movement relative to the frame about a pivot axis;

a spring operably connecting the trailing arm to the vehicle frame for resisting the pivotal movement of the trailing arm about the pivotal axis toward the frame;

a frame bracket mounted to the hanger bracket;

an arm bracket mounted to the trailing arm;

an inflatable lift bag positioned laterally of the hanger bracket in a direction transverse to the vehicle frame and extending between the frame and arm brackets for selectively raising the trailing arm relative to the frame when the lift bag is inflated; and an axle rigidly mounted to the trailing arm.

25. The lift axle suspension according to claim 24 wherein the frame bracket is positioned at a lower portion of the hanger bracket and the arm bracket is positioned at an upper portion of trailing arm.

26. The lift axle suspension according to claim 25 wherein the hanger bracket is adapted to be mounted to an outboard side of the frame rail.

27. A lift axle suspension for selectively supporting a vehicle frame on an axle with ground engaging wheels, the lift axle suspension comprising:

a pair of trailing arm assemblies adapted to be molted to a vehicle frame, each of the trailing arm assemblies comprising:

a hanger bracket adapted to be mounted to the vehicle frame;

a trailing arm having forward and rearward ends and pivotally mounted to the hanger bracket between the forward and rearward ends for pivotal movement relative to the frame about a pivot axis;

a spring operably connecting the trailing arm to the vehicle frame for resisting the pivotal movement of the trailing arm about the pivotal axis toward the frame;

an inflatable lift bag positioned laterally of the hanger bracket in a direction transverse to the vehicle frame and having a portion mounted to the hanger bracket forwardly of the pivot axis, and operably connecting the trailing arm to the hanger bracket for selectively raising the trailing arm relative to the frame when the lift bag is inflated; and an axle rigidly mounted to the trailing arm rearwardly of the pivot axis.

28. The lift axle suspension according to claim 27 wherein substantially all of the lift bag is located forwardly of the pivot axis.

29. The lift axle suspension according to claim 28 wherein the lift bag is located above the forward end of the trailing arm.

\* \* \* \* \*

UNITED STATES PATENT AND TRADEMARK OFFICE
CERTIFICATE OF CORRECTION

PATENT NO.    : 6,471,223 B1
DATED         : October 29, 2002
INVENTOR(S)   : Richardson It is certified that error appears in the above-identified patent and that said Letters Patent is hereby corrected as shown below:

<u>Title page,</u>
Item [57], ABSTRACT,
Line 4, "includes" should be -- comprises --.
Line 15, "iift" should be -- lift --.

<u>Column 8,</u>
Line 2, before "trailing arm" insert -- the --.

Signed and Sealed this

Eighth Day of July, 2003

JAMES E. ROGAN
*Director of the United States Patent and Trademark Office*